US012799975B2

(12) United States Patent
Ito

(10) Patent No.: US 12,799,975 B2
(45) Date of Patent: Nov. 17, 2026

(54) SLIDING MEMBER

(71) Applicant: DAIDO METAL COMPANY LTD., Nagoya (JP)

(72) Inventor: Kosuke Ito, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 148 days.

(21) Appl. No.: 18/877,807

(22) PCT Filed: Mar. 28, 2024

(86) PCT No.: PCT/JP2024/012735
§ 371 (c)(1),
(2) Date: Dec. 20, 2024

(87) PCT Pub. No.: WO2024/210037
PCT Pub. Date: Oct. 10, 2024

(65) Prior Publication Data

US 2025/0382990 A1 Dec. 18, 2025

(30) Foreign Application Priority Data

Apr. 5, 2023 (JP) ................................ 2023-061455

(51) Int. Cl.
*F16C 29/02* (2006.01)
*F16C 33/12* (2006.01)

(52) U.S. Cl.
CPC ............ *F16C 29/02* (2013.01); *F16C 33/121* (2013.01); *F16C 2204/10* (2013.01)

(58) Field of Classification Search
CPC ......................... F16C 1113/40; F16C 1113/42; F16C 1113/46
See application file for complete search history.

(56) References Cited

U.S. PATENT DOCUMENTS

2021/0010462 A1 1/2021 Hoelzl et al.

FOREIGN PATENT DOCUMENTS

JP S63149347 A 6/1988
JP 2005291360 A 10/2005
JP 2012229465 A 11/2012
(Continued)

OTHER PUBLICATIONS

English Translation of JP2020131208A, Ogawa et al., from EPO, Jul. 16, 2026 (Year: 2026).*
(Continued)

*Primary Examiner* — Adam Krupicka
(74) *Attorney, Agent, or Firm* — KARCESKI IP LAW, PLLC

(57) ABSTRACT

A sliding member includes: a substrate; and a sliding alloy part provided on a surface of the substrate and formed of a Cu-based alloy containing Cu as a main component in the form of an assembly of a plurality of unit alloy parts. The sliding alloy part contains: a first soft phase present in interface regions defined in ranges preset with reference to unit interfaces and a second soft phase present in regions other than the interface regions. When the total area ratio of the first soft phase contained per unit area is defined as a first area ratio S1, and the total area ratio of the second soft phase contained per unit area is defined as a second area ratio S2, the sliding alloy part satisfies S1<S2.

9 Claims, 10 Drawing Sheets

(56) References Cited

FOREIGN PATENT DOCUMENTS

| | | | |
|---|---|---|---|
| JP | 2018070972 | A | 5/2018 |
| JP | 2020131208 | A | 8/2020 |

OTHER PUBLICATIONS

Japanese Action dated Oct. 21, 2025, for Japanese Patent Application No. 2025-512527.
International Search Report dated Jun. 18, 2024, for International Patent Application No. PCT/JP2024/012735.
Extended European Search Report dated Jul. 16, 2026, for European Patent Application No. 24784826.0.

* cited by examiner

Fig.7

| | | S1 | S2 | First soft phase | Second soft phase | | T12 | Third soft phase | T3 | A | H | Hardness | P1 | P2 | Z | Rating |
|---|---|---|---|---|---|---|---|---|---|---|---|---|---|---|---|---|
| | | | | Material | Material | Da | | Material | | deg. | | HV | MPa | MPa | μ m | — |
| | | | | | | μ m | | | | | | | | | | |
| Example | 1 | 6.04 | 7.79 | Bi | Bi | 15.8 | ○ | Sn | ○ | 47 | - | 103.3 | 140 | 45.4 | 3.8 | ◎ |
| | 2 | 8.05 | 8.42 | Bi | Bi | 16.2 | ○ | Al+Ni | ○ | 38 | - | 176.5 | 140 | 39.1 | 4.0 | ○ |
| | 3 | 8.62 | 8.70 | Bi | Bi | 19.0 | ○ | Sn+Ni | ○ | 38 | - | 117.9 | 140 | 54.7 | 3.8 | ◎ |
| | 4 | 7.19 | 7.34 | Bi | Bi | 21.2 | ○ | Sn | ○ | 46 | - | 98.4 | 130 | 54.3 | 4.0 | ○ |
| | 5 | 2.88 | 2.98 | Bi | Bi | 19.3 | × | Sn | ○ | 64 | - | 101.7 | 140 | 41.8 | 3.6 | ○ |
| | 6 | 12.44 | 13.00 | Bi | Bi | 16.5 | × | Sn | ○ | 56 | - | 93.6 | 140 | 54.6 | 4.3 | ○ |
| | 7 | 6.00 | 6.93 | Bi | Bi | 16.4 | ○ | Sn | × | 44 | - | 78.2 | 140 | 48.7 | 4.3 | ○ |
| | 8 | 9.88 | 10.22 | Bi | Bi | 15.2 | ○ | Sn | × | 42 | - | 130.0 | 130 | 49.3 | 3.7 | ○ |
| | 9 | 9.72 | 10.31 | Bi | Bi | 19.6 | ○ | Sn | ○ | 19 | - | 97.6 | 130 | 50.2 | 3.8 | ○ |
| | 10 | 8.24 | 8.59 | Bi | Bi | 17.4 | ○ | Sn | ○ | 71 | - | 103.1 | 130 | 53.4 | 4.0 | ○ |
| | 11 | 8.96 | 9.26 | Bi | Bi | 19.5 | ○ | Sn | ○ | 23 | ◎ | 104.7 | 140 | 62.9 | 3.3 | ◎ |
| | 12 | 7.46 | 8.32 | Bi | Bi | 17.6 | ○ | Sn | ○ | 65 | ○ | 101.3 | 130 | 63.0 | 3.3 | ○ |
| | 13 | 7.98 | 8.53 | Bi | Bi | 16.9 | ○ | Sn | ○ | 39 | × | 98.0 | 120 | 55.5 | 3.4 | ○ |
| Comparative Example | 1 | 8.05 | 8.01 | Bi | Bi | 16.4 | ○ | Sn | ○ | 38 | - | 97.3 | 110 | 47.0 | 4.2 | × |

Fig.8

| | |
|---|---|
| Surface pressure | Increments of 10 MPa from 100 MPa |
| Lubricating oil | VG22 |
| Temperature of lubricating oil | 100°C |
| Test time | $1.0 \times 10^7$ cycle |

Fig.9

| | |
|---|---|
| Circumferential speed | 20m/s |
| Load | 5MPa/10min |
| Test mode | Cumulative loading |
| Lubricating oil | VG22 |
| Temperature of lubricating oil | 100°C |
| Feed rate of lubricating oil | 150ml/min |

Fig.10

| | |
|---|---|
| Load | 5MPa |
| Speed | 4m/s |
| Test mode | Start and stop |
| Test conditions | Acceleration for 0.5 seconds<br>Retention for 1.0 second<br>Deceleration for 0.5 seconds<br>Suspension for 2.0 seconds |
| Test time | 20hr |
| Lubricating oil | VG22 |
| Temperature of lubricating oil | 100°C |
| Feed rate of lubricating oil | 100ml/min |

SLIDING MEMBER

CROSS-REFERENCE TO RELATED APPLICATION(S)

The present application is a National Stage Entry into the United States Patent and Trademark Office from International Patent Application No. PCT/JP2024/012735, filed on Mar. 28, 2024, which relies on and claims priority to Japanese Patent Application No. 2023-061455, filed on Apr. 5, 2023, the entire contents of both of which are incorporated herein by reference.

FIELD OF THE INVENTION

The present disclosure relates to a sliding member.

BACKGROUND OF THE INVENTION

In axial sliding members, for example, a sliding alloy part that slides past a counterpart material is provided on a surface of a substrate. Such a sliding alloy part is integrally provided on a substrate by attaching a separate member, for example, by laser welding or sputtering. In forming a sliding alloy part by attaching a separate member on a substrate, ease in controlling the alloy structure and composition of a separate member makes it easy to ensure desired sliding performance for the sliding alloy part. In configuring a substrate and a sliding alloy part with separate members in that way, on the other hand, ensuring desired sliding properties for the sliding alloy part is not easy because of the progression of wear. Moreover, use of separate members for a substrate and a sliding alloy part may result in the occurrence of slippage on the interface between the outer peripheral surface of a sliding member including the sliding alloy part and a housing to which the sliding member is attached. In view of this, it has been proposed to form a sliding alloy part on a surface of a substrate by welding (see U.S. Patent Application Publication No. US2021/0010462).

While U.S. Patent Application Publication No. US2021/0010462 discloses forming a sliding alloy part by welding, however, the alloy structure and composition of the sliding alloy part are not strictly controlled. Thus, it is difficult to strictly control the alloy structure and composition of the sliding alloy part. For this reason, the sliding alloy part formed by welding as disclosed in U.S. Patent Application Publication No. US2021/0010462 suffers from a problem of difficulty in improvement in sliding properties such as fatigue resistance.

SUMMARY OF THE INVENTION

In view of such circumstances, an object of the present disclosure is to provide such a sliding member that the structure and composition of the sliding alloy part to be formed by welding can be controlled and improvement in sliding properties is achieved thereby.

A sliding member according to an embodiment includes: a substrate; and a sliding alloy part provided on a surface of the substrate and formed of a Cu-based alloy containing Cu as a main component in a form of an assembly of a plurality of unit alloy parts. The sliding alloy part contains: a first soft phase present in interface regions defined in ranges preset with reference to unit interfaces of the unit alloy parts; and a second soft phase present in regions other than the interface regions in the unit alloy parts. When the ratio of total area of the first soft phase contained per unit area is defined as a first area ratio S1, and the ratio of total area of the second soft phase contained per unit area is defined as a second area ratio S2, the sliding alloy part satisfies S1<S2.

The sliding alloy part formed by welding is formed of an assembly of a plurality of unit alloy parts. The sliding member of the present embodiment has a specified abundance ratio between the first soft phase and the second soft phase, wherein the first soft phase is present in interface regions defined in ranges preset with reference to unit interfaces, which are interfaces of the unit alloy parts, and the second soft phase is present in regions other than the interface regions. In addition, the ratio of total area of the first soft phase present in the interface regions is smaller than that of the second soft phase present in the regions other than the interface regions. This configuration reduces the propagation of cracks of the sliding alloy part particularly in interface regions close to the interface of the unit alloy layer. Therefore, improvement in sliding properties such as fatigue resistance can be achieved.

BRIEF DESCRIPTION OF THE DRAWINGS

FIG. 7 is a schematic figure showing evaluation of examples and a comparative example of the sliding member according to an embodiment.

FIG. 8 is a schematic figure showing conditions for fatigue strength test for the sliding member according to an embodiment.

FIG. 9 is a schematic figure showing conditions for seizure test for the sliding member according to an embodiment.

FIG. 10 is a schematic figure showing conditions for wear test for the sliding member according to an embodiment.

DESCRIPTION OF EMBODIMENT(S) OF THE INVENTION

The following describes a sliding member according to an embodiment with reference to drawings.

Figure 1:
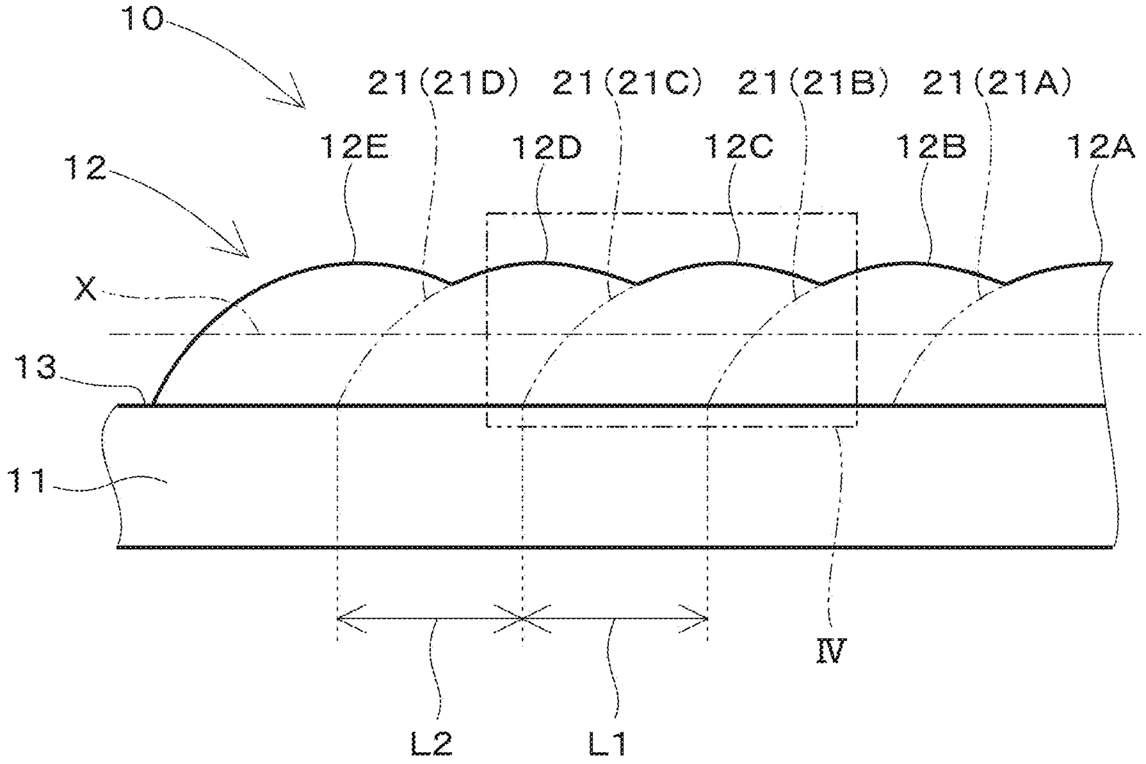
FIG. 1 is a schematic diagram illustrating the configuration of a sliding member according to an embodiment.
Figure 2:
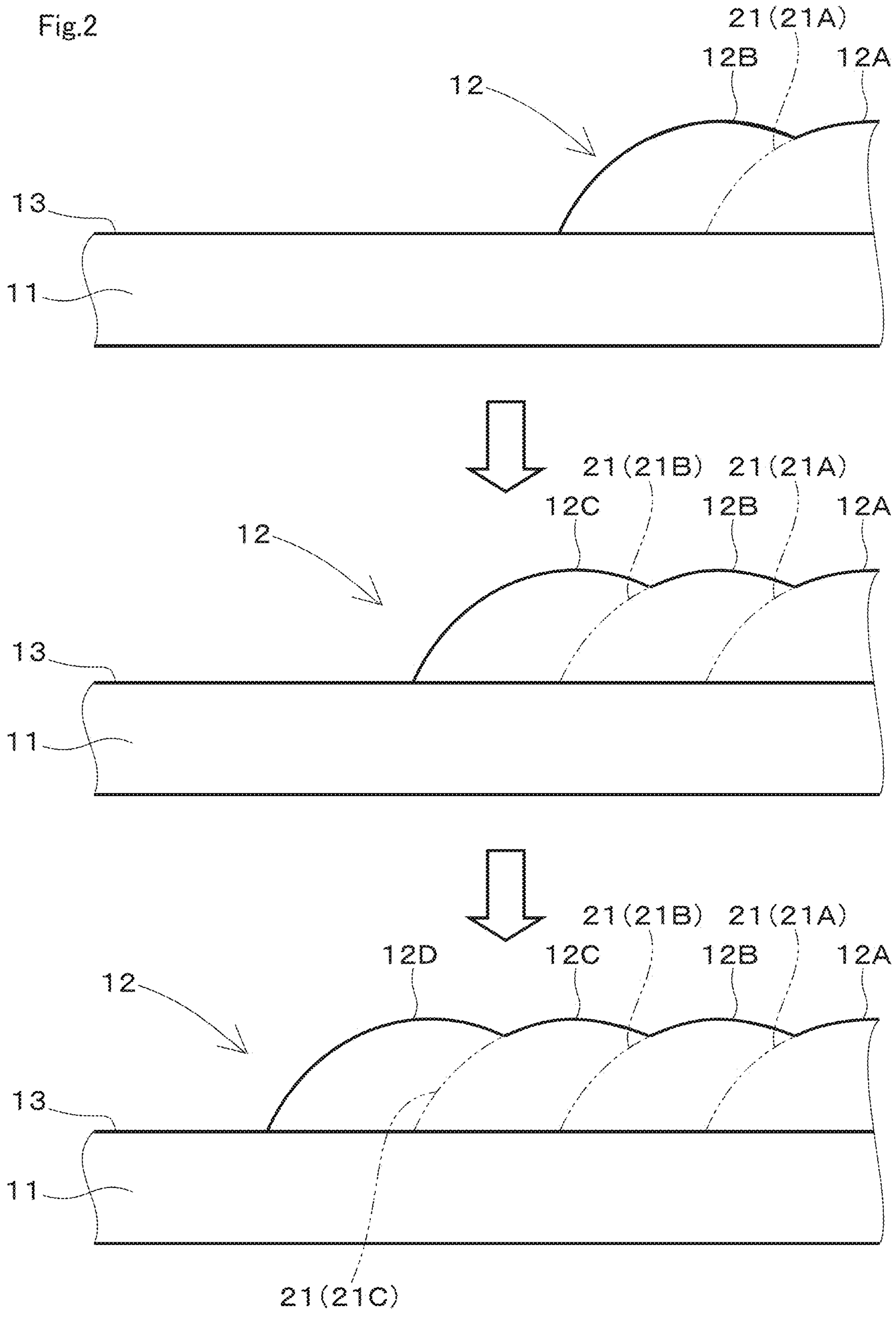
FIG. 2 is a schematic diagram illustrating the configuration of the sliding member according to an embodiment.
Figure 3:
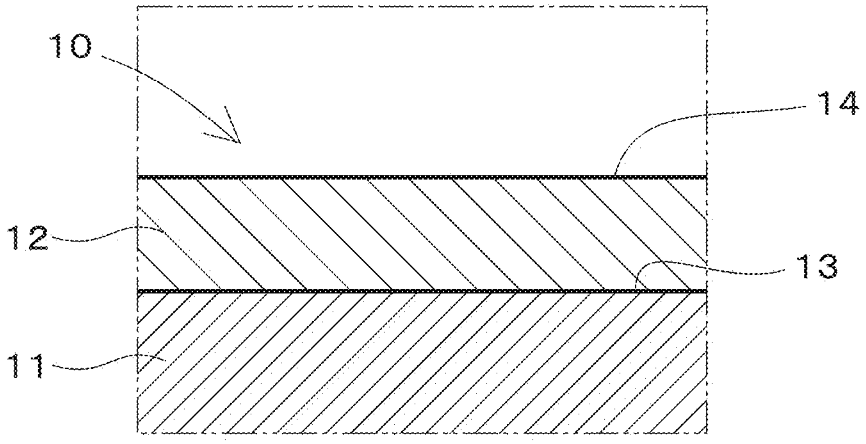
FIG. 3 is a schematic cross-sectional view illustrating the sliding member according to an embodiment.

As illustrated in FIG. 1, the sliding member 10 includes a substrate 11 and a sliding alloy part 12. The substrate 11 is formed of an Fe-based material such as steel. The sliding alloy part 12 is provided on a surface 13 of the substrate 11 by welding. The sliding alloy part 12 is formed of a Cu-based alloy containing Cu as a main component. The sliding alloy part 12 is formed of an assembly of a plurality of unit alloy parts 12A, 12B, 12C, 12D, and 12E. The sliding alloy part 12 is formed by welding. As illustrated in FIG. 2, the unit alloy parts 12A to 12E are each formed as a single unit through one welding operation to constitute the sliding alloy part 12. The unit alloy parts 12A to 12E are formed in order through a continuous flow of welding operations to constitute the sliding alloy part 12. The sliding alloy part 12 is removed of a part opposite to the substrate 11, for example, to a depth of a line X shown in FIG. 1 by polishing or cutting. Through this, the sliding alloy part 12 is provided with a sliding surface 14 that is formed in the surface opposite to the substrate 11 as illustrated in FIG. 3 and slides past a counterpart material not shown. For description, FIG. 1 shows an example in which the sliding alloy part 12 is configured with five unit alloy parts 12A to 12E. However, this is merely an example, and it goes without saying that the sliding alloy part 12 can be configured with unit alloy parts in any number equal to or greater than two. In addition, an intermediate layer formed by Cu plating or the like may be included between the substrate 11 and the sliding alloy part 12.

In the sliding alloy part 12, a unit interface 21 is formed in an interface part between adjacent two of the plurality of unit alloy parts 12A to 12E as illustrated in FIGS. 1 and 2. Specifically, the interface part between the unit alloy part 12A and the unit alloy part 12B corresponds to the unit interface 21A. Likewise, the interface part between the unit alloy part 12B and the unit alloy part 12C corresponds to the unit interface 21B, the interface part between the unit alloy part 12C and the unit alloy part 12D corresponds to the unit interface 21C, and the interface part between the unit alloy part 12D and the unit alloy part 12E corresponds to the unit interface 21D.

Figure 4:
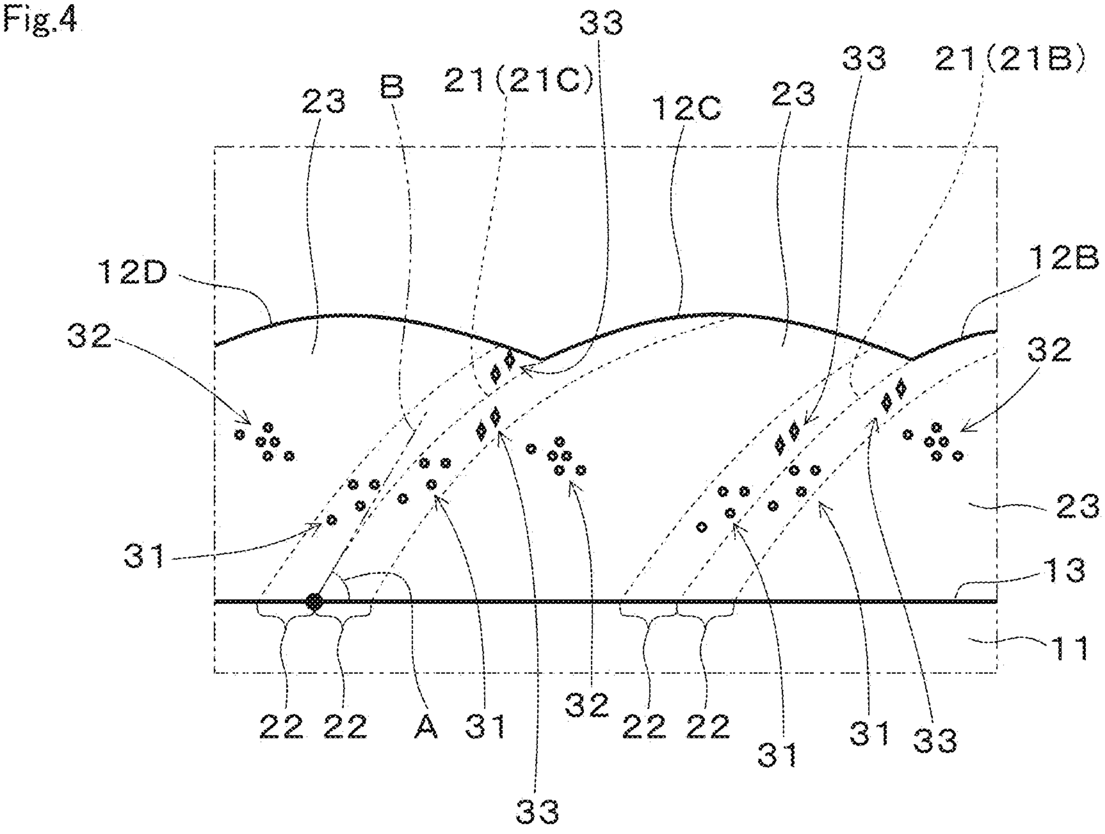
FIG. 4 is a schematic diagram showing an enlarged view of the IV part in FIG. 1.

The sliding alloy part 12 has interface regions 22 in ranges preset as illustrated in FIG. 4 with reference to the unit interfaces 21. FIG. 4 primarily shows the interface part between the unit alloy part 12C and the unit alloy part 12D as an example. A pair of interface regions 22 is set in such a manner that each covers a specific range in adjacent two of the unit alloy parts 12A to 12E with reference to the unit interface 21. In the case that a plurality of unit alloy parts 12A to 12E is present as illustrated in FIG. 1, the unit alloy part 12C of them lies in the range from the unit interface 21B with the unit alloy part 12B to the unit interface 21C with the unit alloy part 12D. The distance from the unit interface 21B to the unit interface 21C is defined as distance L1. Likewise, the distance from the unit interface 21C to the unit interface 21D with the unit alloy part 12D sandwiched therebetween is defined as distance L2. These distances L1 and L2 each correspond to a pitch of welding to form the sliding alloy part 12.

As illustrated in FIG. 4, the interface regions 22 set along the unit interface 21C between the unit alloy part 12C and the unit alloy part 12D are defined to cover a range of 5% of the distance L1 in the unit alloy part 12C and a range of 5% of the distance L2 in the unit alloy part 12D with reference to the unit interface 21C. The region other than the interface regions 22 in the unit alloy part 12C is an alloy matrix phase region 23. Specifically, for the unit alloy part 12C, the region other than the interface region 22 formed in the unit alloy part 12C with reference to the unit interface 21B and the interface region 22 formed in the unit alloy part 12C with reference to the unit interface 21C is an alloy matrix phase region 23.

The sliding alloy part 12 contains soft phases. The soft phases are softer than the matrix of the Cu alloy constituting the sliding alloy part 12. In the present embodiment, the soft phases are made of, for example, Bi or a Bi alloy. If a Bi alloy is used for the soft phases, the soft phases may contain Se and so on. The soft phases are finely dispersed in the sliding alloy part 12. Among them, the soft phase present in the interface regions 22 is defined as a first soft phase 31. The soft phase present in the alloy matrix phase regions 23 is defined as a second soft phase 32. The first soft phase 31 and the second soft phase 32 are almost identical in composition, and distinguished by which of the interface regions 22 and the alloy matrix phase regions 23 the existence area is. For simplicity, FIG. 4 shows only parts of the first soft phase 31 and the second soft phase 32 as an example.

The ratio of total area of the first soft phase 31 contained per unit area within a preset observation range in the interface regions 22 of the sliding alloy part 12 is defined as a first area ratio S1. The ratio of total area of the second soft phase 32 contained per unit area within a preset observation range in the alloy matrix phase regions 23 of the sliding alloy part 12 is defined as a second area ratio S2. Each observation range is preferably set as a range enough to include the first soft phase 31 or the second soft phase 32 in the range. For example, each observation range is set as a range of 300 μm×400 μm. At that time, the relationship between the first area ratio S1 and the second area ratio S2 is $S1<S2$. Specifically, in the sliding alloy part 12, the total area of the first soft phase 31 present in the interface regions 22 is smaller than that of the second soft phase 32 present in the alloy matrix phase regions 23. In the case that a soft phase is contained in the matrix of a Cu alloy as with the sliding alloy part 12, the interface part between the matrix and the soft phase has lower strength than the region of the matrix without the formation of the interface part. Therefore, cracks generated in the sliding alloy part 12 by loads applied in sliding are likely to propagate along the interface between the matrix and each soft phase. In the present embodiment, the total area ratio of the first soft phase 31, which is contained in the interface regions 22 close to the unit interfaces 21 of the unit alloy part 12, is smaller than that of the second soft phase 32, which is contained in the alloy matrix phase regions 23 distant from the unit interfaces 21. Accordingly, the propagation of cracks in the sliding alloy part 12 is reduced particularly in the interface regions 22. Therefore, the sliding alloy part 12 has improved strength, and improvement in sliding properties such as fatigue resistance can be achieved. The crystal grain size of the sliding alloy part 12 in the interface regions 22 and that in the alloy matrix phase regions 23 are different. Specifically, the crystal grain size of the matrix in the interface regions 22 is as smaller as 1/10 or less of that in the alloy matrix phase regions 23. Thus, the sliding alloy part 12 is provided with a reduced crystal grain size in the interface regions 22 than in the alloy matrix phase regions 23.

The second soft phase 32 present in the alloy matrix phase regions 23 has a maximum outer diameter Da of $Da \leq 20$ μm. That is, the second soft phase 32 has a reduced outer diameter Da as small as 20 μm or less. For the outer diameter Da of the second soft phase 32, a grain of the second soft phase 32 that is expected to be the largest is visually selected for measurement from an arbitrary observation cross-section extracted from the sliding alloy part 12. A circle is circumscribed about the extracted grain of the second soft phase 32 that is expected to be the largest, giving a circumscribed circle. Then, the diameter of the circumscribed circle is defined as the outer diameter Da. Since the outer diameter Da of the second soft phase 32 is 20 μm or less, size reduction is achieved in the second soft phase 32. As a result, the propagation of cracks along the interfaces between the matrix and the second soft phase 32 is reduced also in the alloy matrix phase regions 23. Accordingly, improvement in sliding properties such as fatigue resistance can be achieved. In addition, the size reduction of the second soft phase 32 results in improvement in the dispersibility of the second soft phases 32 in the alloy matrix phase regions 23. Accordingly, the second soft phase 32 contained in the alloy matrix phase regions 23 of the sliding alloy part 12 is stably supplied to a sliding part to a counterpart material not shown. Therefore, the adhesion in the sliding part to a counterpart material can be reduced.

The sliding alloy part 12 may further contain a third soft phase 33. The third soft phase 33 is preferably present in the interface regions 22, and formed of a specific element differing from elements in the first soft phase 31. The third soft phase 33 more preferably contains one or more elements selected from the specific elements Sn, Ni, and Al. The total area ratio of the third soft phase 33 is larger in the interface regions 22 than in the alloy matrix phase regions 23. The specific elements forming the third soft phase 33 reinforce the matrix of the sliding alloy part 12 through solid solution formation. The specific elements improve the strength of the Cu-based alloy in the sliding alloy part 12 through the formation of an intermetallic compound, contributing to improvement in wear resistance. The sliding alloy part 12 may contain up to 6 mass % of Zn in addition to the first soft phase 31, the second soft phase 32, and the third soft phase 33.

The sliding alloy part 12 functions as a sliding layer of the sliding member 10. The sum total T12 of the amount of the first soft phase 31 and the second soft phase 32 contained in the sliding alloy part 12 is preferably 3 mass % to 15 mass % with respect to the mass of the sliding alloy part 12. The total amount of the first soft phase 31 and the second soft phase 32 contained in the sliding alloy part 12 is more preferably 5 to 12 mass %. The amount of the third soft phase 33 contained in the sliding alloy part 12 is preferably 5 mass % to 15 mass % with respect to the mass of the sliding alloy part 12. The amount of the third soft phase 33 contained in the sliding alloy part 12 is further preferably 8 to 12 mass %. The second soft phase 32 is a soft phase that reduces the adhesion in a sliding part to a counterpart material not shown to contribute to improvement in the seizure resistance of the sliding alloy part 12. Accordingly, improvement in seizure resistance can be achieved in combination with ensuring the fatigue resistance of the sliding alloy part 12 by setting the total amount of the first soft phase 31 and the second soft phase 32 to 3 mass % or more.

The sum total T12 of the amount of the first soft phase 31 and the second soft phase 32 is preferably set to 15 mass % or less. The amount of the second soft phase 32 contained in the alloy matrix phase regions 23 is made proper by setting the sum total T12 of the amount of the first soft phase 31 and the second soft phase 32 to 15 mass % or less. Thereby, the propagation of cracks in the sliding alloy part 12 can be prevented with high precision. As a result, further improvement in the fatigue resistance of the sliding alloy part 12 through reduction of the propagation of cracks can be achieved in combination with improvement in the seizure resistance of the sliding member 10.

The strength of the sliding alloy part 12 in the sliding member 10 can be ensured by setting the sum total T3 of the amount of the third soft phase 33 to 5 mass % or more. In addition, the amount of the third soft phase 33 is preferably set to 15 mass % or less. Setting the amount of the third soft phase 33 to 15 mass % or less in this way allows the Cu-based alloy forming the sliding alloy part 12 not to be excessively hard, and strength and toughness can be achieved in combination in the sliding alloy part 12.

As described above, the sliding alloy part 12 is formed by welding. Hence, each of the unit interfaces 21 may have a cross-section formed as a curve in the thickness direction of the sliding alloy part 12 as illustrated in FIG. 4. In the cross-section, the intersection of each unit interface 21 and the substrate 11 is defined as an intersection P, and a virtual tangent line to the unit interface 21 at the intersection P is defined as a tangent line B. The angle A between the tangent line B and the surface 13, which is an interface between the sliding alloy part 12 and the substrate 11, preferably satisfies 20°≤A≤70°. The probability that cracks that propagate from the interface between the substrate 11 and the sliding alloy part 12 or from the sliding surface 14 reach parts where adjacent two of the unit alloy parts 12A to 12E are overlapping increases by setting the angle A to 70° or less. Specifically, taking the unit interface 21C in FIG. 4 as an example, cracks that propagate from the interface between the substrate 11 and the sliding alloy part 12 or from the sliding surface 14 run into the unit interfaces 21 with overlapping before propagating to the opposite side. Accordingly, cracks that have been generated in the vicinity of the interface or in the sliding surface 14 are prevented from propagating through the sliding alloy part 12 to the opposite side. In addition, setting the angle A to 20° or more allows the alloy matrix phase regions 23 to be readily exposed to the sliding surface 14 after forming the sliding alloy part 12. The alloy matrix phase regions 23 are made of a Cu-based alloy, and hence have high seizure resistance. Accordingly, improvement in the seizure resistance can be achieved in combination with ensuring the fatigue resistance of the sliding alloy part 12. In the case that each of the unit interfaces 21 is formed as a line in the cross-section in the thickness direction of the sliding alloy part 12, the angle A between each of the unit interfaces 21 and the surface 13 preferably satisfies 20°≤A≤70°.

The sliding alloy part 12 may contain hard particles that are externally added to improve the wear resistance. In the case that hard particles are added, the added amount H of the hard particles is preferably up to 5 mass % or less, and more preferably 2 mass % or less. The Vickers hardness HV of the sliding alloy part 12 is preferably 80 to 120, and more preferably 90 to 110. By virtue of the hardness HV of the sliding alloy part 12 being 80 or more, the sliding alloy part 12 is less deformed by loads from a counterpart material not shown. To reduce the influence on counterpart materials, the hardness HV of the sliding alloy part 12 is preferably 120 or less.

Figure 5:
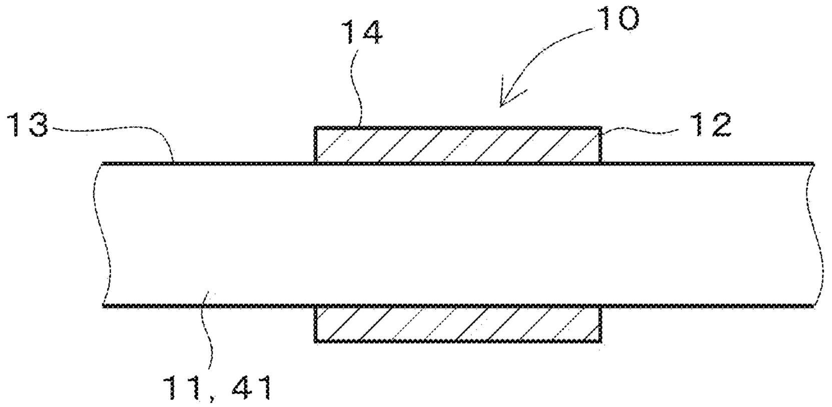
FIG. 5 is a schematic cross-sectional view illustrating an example in which the sliding member according to an embodiment is applied.

After being subjected to mechanical processing such as cutting and polishing, the above-described sliding member 10 may be provided with an overlay layer, an intermediate layer, or the like on the face opposite to the substrate 11 of the sliding alloy part 12. As illustrated in FIG. 5, for example, the sliding member 10 can be produced with a cylindrical or circular-tube-like shaft member 41 as the substrate 11 and the sliding alloy part 12 can be provided by welding on the outer periphery of the shaft member 41. The sliding member 10 produced in this way can be used, for example, as a rotational shaft member to support a planetary gear.

Next, a method for manufacturing the sliding member 10 of the present embodiment will be described.

Figure 6:
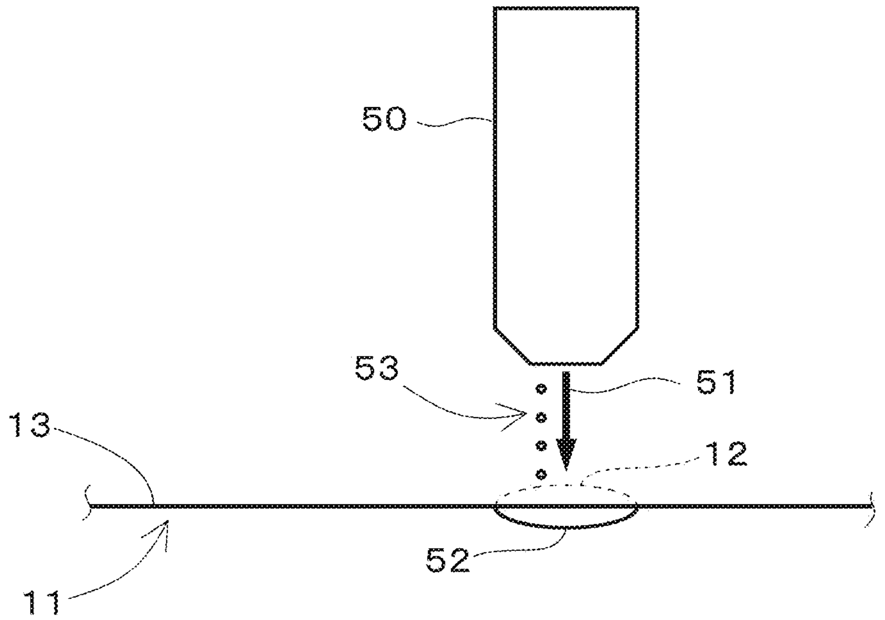
FIG. 6 is a schematic diagram illustrating a welding device to manufacture the sliding member according to an embodiment.

For the sliding member 10 of the present embodiment, the sliding alloy part 12 is formed on the substrate 11 by welding with laser cladding as illustrated in FIG. 6. In forming the sliding alloy part 12, the substrate 11 is irradiated with laser light 51 from a welding device 50. Through irradiation with the laser light 51, powder 53 provided toward the substrate 11 concomitantly with the irradiation with the laser light 51 melts. The molten powder 53 generates a molten pool 52, and solidifies through cooling to form the sliding alloy part 12. For example, in the case that a shaft member 41 is used as the substrate 11 as shown in FIG. 5, the shaft member 41 is rotated around the axis when being irradiated with the laser light 51. As a result, the sliding alloy part 12 is continuously formed on the outer peripheral surface as the surface 13 of the shaft member 41. In an example in which a shaft member 41 of 150 mm in diameter is used as the substrate 11, the rotational speed of the shaft member 41 is preferably set to 1π rad/min to 5π rad/min. The rotational speed of the shaft member 41 is more preferably set to 1.5π rad/min to 4× rad/min. In addition to this, the moving speed of the shaft member 41 in the axial direction is preferably set to 10 mm/min to 50 mm/min. Through rotating the shaft member 41 and simultaneously moving it in the axial direction, the sliding alloy part 12 is formed roughly as a dense spiral on the surface 13 of the shaft member 41. As a result, the cross-section of the formed sliding alloy part 12 shows an assembly of the unit alloy parts 12A to 12E. In the present embodiment, the output power of the laser light 51 is preferably 1 kW to 10 kW. The deposition coefficient, which is the amount of the powder 53 melted to the output power of the laser light 51, is preferably 0.3 kg/kW to 1 kW/kg. The deposition coefficient is calculated from the output power of the laser light 51 and the feeding rate of the powder 53.

In an example, the powder 53 that is made of a Cu-based alloy to form the sliding alloy part 12 contains 5 mass % to 15 mass % of Sn, 3 mass % to 15 mass % of Bi, and Cu and inevitable impurities as the balance. A composition suitable for the sliding alloy part 12 to be formed can be set for the powder 53 made of a Cu-based alloy. It is preferred to form the sliding alloy part 12 in a thickness of 2 mm or less on a surface of the substrate 11. It is more preferred to subject the formed sliding alloy part 12 to mechanical processing such as cutting and polishing to give a thickness of 1 mm or less.

In the present embodiment, each unit interface 21 is formed along the border of adjacent two of the unit alloy parts 12A to 12E through the formation of the sliding alloy part 12 by welding with laser cladding. In the interface regions 22 including the unit interfaces 21, the matrix of a Cu-based alloy is finely structured, and the total area ratio of the soft phase is relatively small. As a result, the propagation of cracks is blocked in the interface regions, and improved fatigue resistance is achieved. However, without being limited to the above-described laser cladding, any method may be used for the formation of the sliding alloy part 12.

Hereinafter, examples of the sliding member 10 of the present embodiment will be described.

Three test pieces were produced for each of the examples and comparative example. For each of the examples and comparative example, as shown in FIG. 7, the area ratio S1, the area ratio S2, the maximum outer diameter Da of the second soft phase 32, the sum total T12 of amount, the sum total T3 of amount, and the angle A were calculated and measured. For the area ratio S1, the area ratio S2, and the maximum outer diameter Da of the second soft phase 32, the maximum value among measurement results for three test pieces is shown. For the angle A, the mean of measurement results for three test pieces is shown. Each of the examples and comparative example was evaluated on "alloy hardness", and evaluated on sliding properties in "fatigue strength test" based on maximum fatigue-free surface pressure P1, "seizure test" based on maximum seizure-free surface pressure P2, and "wear test" based on amount of wear Z.

In observation of a sliding alloy part 12, the sliding alloy part 12 was cut in the direction perpendicular to the direction of progression of welding with laser cladding, and the resulting cross-section was observed. The cross-section was polished and then etched. In the cross-section, unit interfaces 21, interface regions 22, and alloy matrix phase regions 23 were distinguished. A soft phase contained in interface regions 22 is the first soft phase 31, and a soft phase contained in alloy matrix phase regions 23 is the second soft phase 32.

For the crystal grain size in interface regions 22, an observation range of 300 μm×400 μm was arbitrarily picked out from a distinguished interface region 22, and the observation range picked out was observed with an optical microscope at a magnification of 300 times. The largest crystal grain in the observation range of the interface region 22 was extracted, and the diameter of a circumscribed circle about the extracted crystal grain was determined as the first crystal grain size Dc1. For alloy matrix phase regions 23, an observation range of 300 μm×400 μm was arbitrarily picked out from a distinguished alloy matrix phase region 23, and the observation range picked out was observed with an optical microscope at a magnification of 100 times. The largest crystal grain in the alloy matrix phase region 23 was extracted, and the diameter of a circumscribed circle about the extracted crystal grain was determined as the second crystal grain size Dc2.

The first area ratio S1 of the first soft phase 31 contained in interface regions 22 was determined from an arbitrary observation range of 300 μm×400 μm extracted from an interface region 22 with an optical microscope at a magnification of 500 times. Likewise, the second area ratio S2 of the second soft phase 32 contained in alloy matrix phase regions 23 was determined from an arbitrary observation range of 300 μm×400 μm extracted from an alloy matrix phase region 23 with an optical microscope at a magnification of 500 times. These first area ratio S1 and second area ratio S2 may be mechanically determined, for example, on the basis of color tone difference between a matrix and a soft phase, for example, in an image acquired by photographing an observation range and subjecting the photograph to image processing. It should be noted that in that case the same mechanical measurement conditions are used for the first area ratio S1 and the second area ratio S2.

For alloy hardness, a cross-section of a sliding alloy part 12 was polished, and the hardness HV of the sliding alloy part 12 was then measured with a Vickers hardness tester at a load of 5 N. Measurement of hardness HV was performed three times for each test piece, and the mean was calculated. Fatigue strength test was performed in $1\times10^7$ cycles under conditions shown in FIG. 8. In the fatigue strength test, the initial value of set surface pressure to test pieces was set to 100 MPa, and the surface pressure was increased in increments of 10 MPa. If no fatigue fracture occurred in a test piece until the completion of the predetermined cycles, the test piece was evaluated as passed in the fatigue strength test for the set surface pressure. If any fatigue fracture occurred in a test piece before the completion of the predetermined cycles, the set surface pressure immediately before the set surface pressure at the fatigue fracture was determined as the maximum fatigue-free surface pressure P1.

Seizure test was performed under conditions shown in FIG. 9. In the seizure test, maximum surface pressure without the occurrence of seizure was determined with stepwise increase in surface pressure in increments of 5 MPa every 10 minutes. In the seizure test, measurement was performed three times for each test piece, and the mean of the measurements was calculated as the maximum surface pressure P1. Wear test was performed under conditions shown in FIG. 10. In the wear test, start and stop were repeated to give cycles of acceleration for 0.5 seconds, retention of speed for 1.0 second, deceleration for 0.5 seconds, and suspension for 2.0 seconds. In the wear test, such a series of start and stop was repeated for 20 hours, and the reduction of the thickness of a sliding alloy part 12 after the wear test was determined. The wear test was performed three times for each test piece, and the mean of the reductions was calculated as the amount of wear Z.

For the examples and comparative example shown in FIG. 7, whether the sum total T12 of the amount of the first soft phase 31 and the second soft phase 32 fell within the range of 3 to 15 mass % or not is shown. Examples and a comparative example with the sum total T12 falling within the range of 3 to 15 mass % were rated as "○: good". On the other hand, examples and a comparative example with the sum total T12 being out of the range of 3 to 15 mass % were rated as "X: poor". Specifically, the sum total T12 in Example 5 was less than 3 mass %. The sum total T12 in Example 6 was more than 15 mass %. Similarly, whether the sum total T3 of the amount of the third soft phase 33 fell within the range of 5 to 15 mass % or not is shown.

Examples and a comparative example with the sum total T3 falling within the range of 5 to 15 mass % were rated as "good". On the other hand, examples and a comparative example with the sum total T3 being out of the range of 5 to 15 mass % were rated as "poor". Specifically, the sum total T3 in Example 7 was less than 5 mass %. The sum total T3 in Example 8 was more than 15 mass %.

For the examples and comparative example shown in FIG. 7, whether the added amount H of hard particles was 5 mass % or less is shown. "-" is shown for examples and a comparative example to which no hard particle was added. The added amount H in Example 11 was 2 mass % or less, and rated as "U: very good". The added amount H in Example 12 was 5 mass % or less, and rated as "good". The added amount H in Example 13 was more than 5 mass %, and rated as "poor".

In the evaluation, examples and a comparative example that exhibited a maximum fatigue-free surface pressure P1 of 120 MPa or more in the fatigue resistance test were rated as "good: passed". Furthermore, examples and a comparative example that exhibited a maximum seizure-free surface pressure P2 of 45 MPa or more in the seizure test, an amount of wear Z of 4 μm or less in the wear test, and a maximum fatigue-free surface pressure P1 of 140 MPa or more were rated as "very good: excellent". On the other hand, examples and a comparative example that exhibited a maximum fatigue-free surface pressure P1 of less than 120 were rated as "poor: failed".

As shown in FIG. 7, the relationship between the first area ratio S1 and the second area ratio S2 was S1<S2 in all of Examples 1 to 13. In contrast to this, the relationship between the first area ratio S1 and the second area ratio S2 was S1>S2 in Comparative Example 1. Thus, Examples 1 to 13, in which the relationship between the first area ratio S1 and the second area ratio S2 was S1>S2, exhibited improvement particularly in fatigue resistance as compared with Comparative Example 1. The examples, each having a reduced first area ratio S1 in interface regions 22 as described above, can achieve improvement in fatigue resistance as a sliding property.

Examples 1 to 13 achieved controlled seizure resistance, fatigue resistance, and wear resistance by setting the maximum outer diameter Da of the second soft phase 32, the sum total T12, the sum total T3, the angle A, and the added amount H. Accordingly, Examples 1 to 13 were rated as "very good: excellent" or "good: passed" in the evaluation comprehensively considering seizure resistance, fatigue resistance, and wear resistance. On the other hand, Comparative Example 1 was inferior in fatigue resistance to Examples 1 to 13, and rated as "poor: failed".

The present disclosure described hereinbefore is not limited to the above embodiment, and applicable to various embodiments unless the application departs from the scope of the present disclosure.

The invention claimed is:

1. A sliding member including:

a substrate; and a sliding alloy part provided on a surface of the substrate and formed of a Cu-based alloy containing Cu as a main component in a form of an assembly of a plurality of unit alloy parts, wherein the sliding alloy part contains:

a first soft phase present in interface regions defined in ranges preset with reference to unit interfaces of the unit alloy parts; and a second soft phase present in regions other than the interface regions in the unit alloy parts, and when a total area ratio of the first soft phase contained per unit area within a preset observation range is defined as a first area ratio S1, and a total area ratio of the second soft phase contained per unit area within the observation range is defined as a second area ratio S2, the sliding alloy part satisfies S1<S2.

2. The sliding member according to claim 1, further comprising a third soft phase present in the interface regions, wherein the third soft phase is derived from a specific element differing from elements in the first soft phase.

3. The sliding member according to claim 1, wherein the second soft phase has a maximum outer diameter Da of 20 μm or less.

4. The sliding member according to claim 2, wherein, in the sliding alloy part, a sum total T12 of amount of the first soft phase and the second soft phase is 3 to 15 mass %, and a sum total T3 of amount of the specific element constituting the third soft phase is 5 to 15 mass %.

5. The sliding member according to claim 1, wherein:

each of the unit interfaces has a cross-section formed as a curve in thickness direction, and when a virtual tangent line to an intersection of the unit interface and the substrate is defined in the unit interface, an angle A between the virtual tangent line and an interface between the unit alloy part and the substrate satisfies 20°≤A≤70°.

6. The sliding member according to claim 2, wherein:

the first soft phase and the second soft phase are Bi or a Bi alloy, and the specific element contained in the third soft phase is one or more elements selected from Sn, Ni, and Al.

7. The sliding member according to claim 1, further containing a hard particle at an added amount H of 5 mass % or less in the sliding alloy part.

8. The sliding member according to claim 1, wherein the sliding alloy part has a Vickers hardness HV of 80 to 120.

9. The sliding member according to claim 1, wherein:

the substrate is a shaft member, and the sliding alloy part is provided on an outer periphery of the shaft member.

* * * * *